May 14, 1968   W. K. GLESNER   3,382,530
APPARATUS FOR THE PREPARATION OF SHAPED ARTICLES
Filed April 29, 1965   3 Sheets-Sheet 1

INVENTOR.
William K. Glesner
BY
AGENT
ATTORNEY

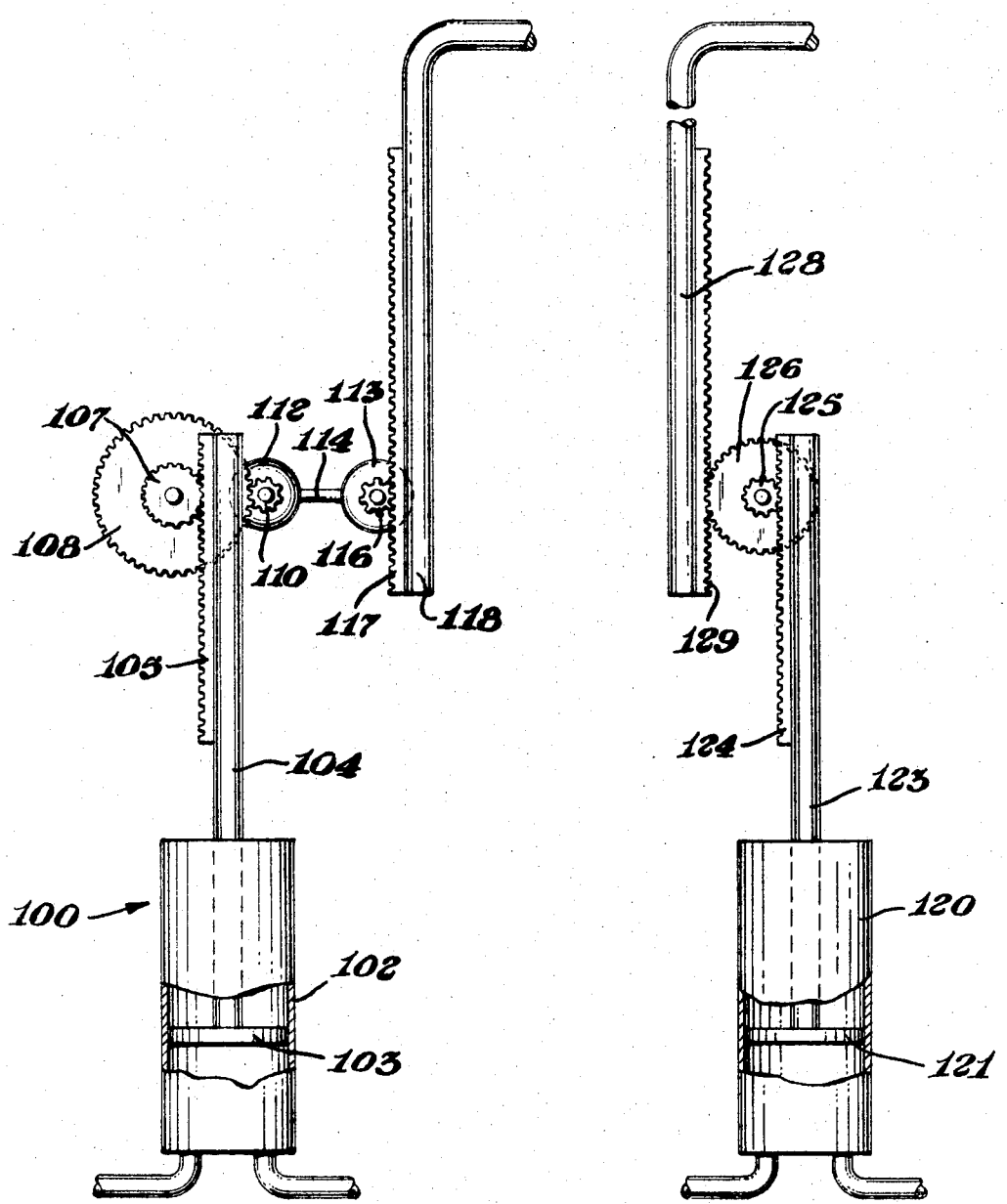

INVENTOR.
William K. Glesner

United States Patent Office 3,382,530
Patented May 14, 1968

3,382,530
APPARATUS FOR THE PREPARATION
OF SHAPED ARTICLES
William K. Glesner, Midland, Mich., assignor to The Dow
Chemical Company, Midland, Mich., a corporation of
Delaware
Filed Apr. 29, 1965, Ser. No. 451,811
14 Claims. (Cl. 18—4)

ABSTRACT OF THE DISCLOSURE

Automated matched die molding employing glass fiber preforms is accomplished using a resin dispenser that applies a fixed quantity of resin to each preform in a pre-determined pattern which permits distribution of the resin on closing of the press without significant disturbance or dislocation of the reinforcing preform. Uniform high quality moldings are obtained.

---

This invention relates to an apparatus for the preparation of shaped articles. It more particularly relates to an apparatus for the production of filament reinforced molded synthetic resinous articles.

Many articles are prepared from curable resin compositions having a reinforcement therein by compression molding or matched die molding. Oftentimes a mat of reinforcing fibers such as glass fibers are impregnated with a curable or hardenable resinous composition placed within a die of a molding press, the resin cured or hardened within the die and the substantially completed part removed from the die. Oftentimes in order to obtain parts of a commercially acceptable and utilitarian finish as well as a reasonable degree of dimensional uniformity, matched die molding is employed wherein a preformed mat of fibers is prepared having a shape generally approximately that of the finished article, a suitable quantity of resin applied to the mat or preform and the combination heated under pressure in a matched die mold in such a manner that air is expelled from the mold or die and the resultant article ideally conforms to a predetermined configuration of the mold. In such a molding operation the quantity of resin is critical in order to obtain uniform parts. For example, if a die is overfilled, the part may be thicker than desired. If an insufficient quantity of resin is employed, voids are obtained in the article. If the resin or hardenable component is poorly distributed on the preformed mat, a portion of the resin may be expelled from the die cavity and an unsatisfactory article results. Alternately, if the die on closing seals sufficiently tightly to prevent the escape of resin and the resin or hardenable material has a relatively high flow viscosity, the distribution of the reinforcing material in the molded article may be changed from the desired configuration or undue and undesired asymmetric stress placed on the die.

It would be particularly desirable if there were available a method and apparatus which would permit uniform and reproducible distribution of a hardenable material on a support which is to be molded. It would be further advantageous if an apparatus were available which would permit the molding of uniform components employing a matched die process. It would be further advantageous if there were available an automated method and apparatus for the preparation of a preformed mat, distribution of the moldable material thereon and for the molding of an article. Further it would be advantageous if there were available a method and apparatus which assured substantially uniform distribution of identical quantities of a hardenable material upon a preformed mat.

These benefits and other advantages in accordance with the invention are achieved in a method of molding reinforced synthetic resinous bodies comprising the steps, supplying a porous preform adapted to receive a hardenable resin, positioning the preform adjacent a hardenable material supplying means, depositing upon the preform a pre-determined quantity of the hardenable material in a pre-determined pattern, positioning the preform and hardenable material, molding the preform and hardenable material to a pre-determined configuration, removing a molded article and repeating the foregoing steps.

The foregoing method is beneficially practiced employing an apparatus for the impregnation and molding of hardenable resin impregnated porous preforms, the apparatus comprising in cooperative combination, a means to supply a porous preform, a transfer and positioning means adapted to receive a preform from the preform supply means and position the preform in a desired location, means to dispense a pre-determined quantity of a hardenable substance in a pre-determined pattern on the preform, means to position the preform having a hardenable substance thereon in a molding means, means to remove a molded piece from the molding means, means to provide a sequential continuous operation of the apparatus.

Further features and advantages in accordance with the present invention will become more apparent from the following specification taken in connection with the drawing wherein:

In FIGURE 1 there is illustrated a schematic fragmentary view of an apparatus in accordance with the invention;

FIGURES 3 and 4 depict alternate means of coupling the resin dispensing or metering cylinder to nozzle positioning means;

Figure 1:
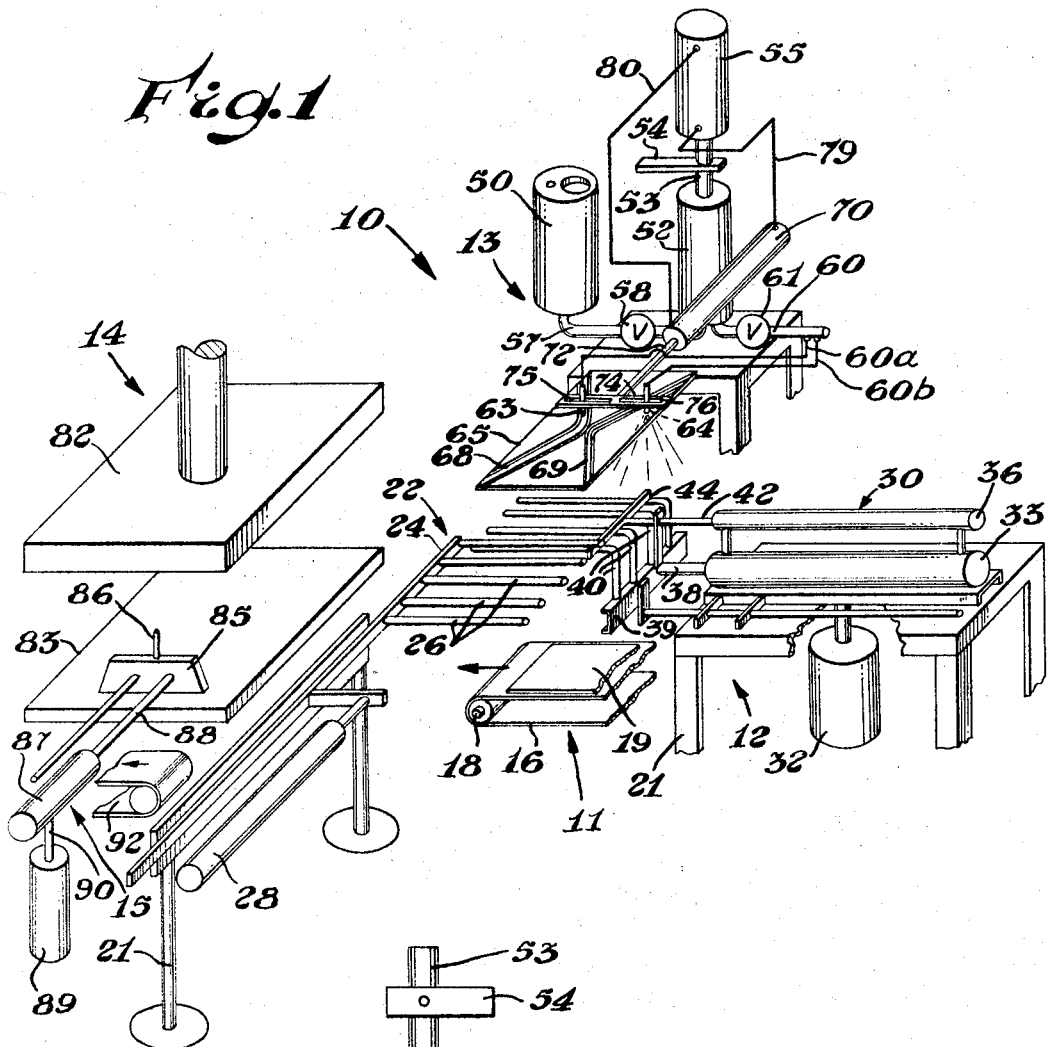

In FIGURE 1 there is schematically illustrated a fractional view of an apparatus in accordance with the invention generally designated by the reference nhmeral 10. The apparatus 10 comprises in cooperative combination a preforn supplying means generally indicated by the reference numeral 11, a transfer and positioning means generally designated by the reference numeral 12, means to dispense a predetermined quantity of a hardenable substance generally designated by the reference numeral 13, a molding apparatus generally designated by the reference numeral 14, and a molded parts take away means 15. The conveying means 11 comprises a conveyor belt 16 supported by a roll 18. A portion of a fibrous or porous preform 19 is disposed on the belt 16. The conveying means 11 delivers the preform 19 in the direction indicated by the arrow. The positioning means 12 comprises in cooperative combination a support means 21 carrying a first preform positioner 22. The positioner 22 comprises a preform support 24 having a plurality of generally parallel support members or tines 26 extending generally perpendicular from the support 24. The support 24 is slidably mounted on the support means 21 and is in cooperative combination with the support positioner 28. The positioner 28 is a pneumatic cylinder which optionally positions the support 24 generally adjacent the discharge portion of the conveyor 11 and remote from the conveyor 11. The support means 21 supports a second preform positioning means generally designated by the reference numeral 30. The second preform positioning means comprises in cooperative combination a vertical positioning means or pneumatic cylinder 32 which serves to raise and lower a first lateral positioning means 35 and a second lateral positioning means 36. The first and the second lateral positioning means 35 and 36 are rigidly secured together. The first lateral positioning means 35 as illustrated is an air cylinder having a piston 38. The piston 38 carries a frame 39 which in turn supports a plurality of tines 40. The tines 40 are so constructed and arranged so as to permit interdigitation with the tines 26 of the support 24 and freely pass therebetween. The second laterally positioning means 36 is an air cylinder having a piston 42. The piston 42 terminates in a stop 44 which has a face disposed substantially at right angles to the direction of travel of the first lateral positioning means 35. The resin dispensing assembly 13 comprises a resin supply 50, and a resin metering unit 52. The resin metering unit 52 in essence is a positive displacement pump comprising a cylinder and tightly fitting piston 53. A control actuating means 54 is rigidly affixed to the piston or shaft 53. The piston 53 of the resin dispensing device 52 is operatively coupled to a positive displacement cylinder or actuating means 55. A conduit 57 having a valve 58 provides communication between the resin supply 50 and the dispensing device 52. A bifurcated discharge conduit 60 is in operative communication with the resin metering unit 52 and has disposed therein a valve 61. The conduit 60 divides into two branches 60a and 60b. The conduit portions 60a and 60b terminate in discharge nozzles 63 and 64. A guide frame 65 supports the nozzles 63 and 64. The guide frame 65 comprises a first nozzle guide track 68 and a second nozzle guide track 69 within which are disposed the nozzles 63 and 64 respectively. The nozzles 63 and 64 are so constructed and arranged so as to be readily slidably positioned along the tracks 68 and 69. A nozzle positioning means 70 is a hydraulic cylinder having a piston or actuating rod 72. The actuating rod 72 is secured to a nozzle positioning yoke 74 having defined therein a first nozzle track 75 adapted to receive the nozzle 63 and a second nozzle track 76 adapted to receive the nozzle 64. The nozzle positioning means 70 is operatively connected to the positive displacement cylinder or actuating means 55 by means of conduits 79 and 80. The molding apparatus 14 comprise an upper molding die 82 and a lower die 83 which are positioned, heated and operated by means not shown. The molded part take away means 15 comprises in cooperative cooperation a molded part engaging means or shoe 85 and a vacuum line 86. The means 85 defines a part engaging face (not shown) and a passageway extending from the line 86 to the face. The face has a configuration to permit the vacuum pick up of the variety of part being molded. A guide 88 is rigidly affixed to the means or shoe 85. A first shoe positioning means or cylinder 87 having a positionable shaft 88 is disposed adjacent the shoe 85 and the shaft 88 is rigidly affixed to the shoe 85. A second shoe positioning means or cylinder 89 is disposed generally adjacent the cylinder 87 and is adapted to move in a plane parallel to the face of the shoe 85. A shaft or piston 90 of the cylinder 89 positions the cylinder 87. A take away conveyor 92 is positioned below the shoe and adjacent the platen 83.

Figure 2:
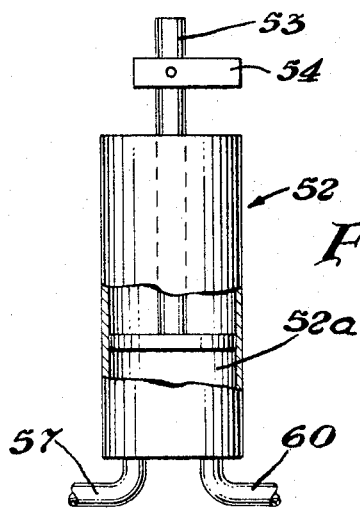
FIGURE 2 is a schematic representation of a portion of the positioning and resin dispensing portion of FIGURE 1.

FIGURE 2 is a cutway view of the resin dispensing device 52 illustrating the conduit 57 and the discharge conduit 60 in communication with a space 52a adapted to be maintained hydraulically full of a hardenable material and to vary in volume with positioning of the piston 53.

FIGURE 3 depicts an alternate means of coupling a resin dispenser generally designated by the reference numeral 100 to a nozzle positioner. The arrangement illustrated in FIGURE 3 comprises a resin dispensing cylinder 102 having a piston 103 to which is affixed an actuating shaft 104. The actuating shaft 104 carries a rack 105. A spur gear 107 is in operative engagement with the rack 105. A second spur gear 108 is rigidly mounted to and coaxially rotatable with the first spur gear 107. The spur gear 108 is in operative engagement with a third rotatably mounted spur gear 110 which is rigidly affixed to a transmitting synchro or selsyn motor 112. A receiving selsyn motor 113 is in operative connection with the transmitting selsyn 112 by means of the cable 114. A fourth spur gear 116 is affixed to the output shaft of the receiving selsyn 113. A rack 117 which is rigidly affixed to a dispensing nozzle positioner 118 is in operative engagement with the spur gear 116. In operation of the modification of FIGURE 3 any variation in position of the actuating shaft 104 causes rotation of the spur gears 107 and 108 which in turn cause rotation of the spur gear 110 which actuates the transmitting selsyn 112. The receiving selsyn 113 follows the rotation of the transmitting selsyn 112 causing the receiving selsyn 113 to rotate the spur gear 116 an amount equal to the rotation of the spur gear 110, thereby imparting to the rack and dispensing nozzle positioner 118 a linear motion directly proportional to the displacement of the actuating shaft 104. By varying the ratio between the spur gears 107, 108, 110 and 116, wide variation in the ratio of motion between the shaft 104 and the dispensing positioner 118 is readily obtained.

An alternate coupling between a resin dispensing cylinder and a nozzle positioner is illustrated in FIGURE 4. In FIGURE 4 there is schematically depicted a resin dispenser generally designated by the reference numeral 120. The resin dispenser 120 has a resin dispensing piston 121 rigidly affixed to an actuating shaft 123. A rack 124 is rigidly affixed to the actuating shaft 123. A first spur gear 125 is rotatably mounted by means (not shown) in operative engagement with the rack 124. A second spur gear 125 is rigidly and coaxially affixed to rotate with the first spur gear 125. A resin dispensing nozzle positioner 128 is disposed generally adjacent the second spur gear 126. A rack 129 is rigidly affixed to the nozzle dispenser 128 and is in operative engagement with the second spur gear 126. Thus, by varying the ratio between the spur gears 125 and 126, the desired rate of travel of the resin dispensing positioning member 128 is readily achieved. The apparatus in accordance with the invention is readily adapted to automatic control and the dispensing of precise quantities of resin or polymerizable material in predetermined patterns and predetermined amounts on a fibrous preform. Electric, hydraulic or pneumatic controls and interlocks are readily provided to permit automatic sequential operation of the apparatus in accordance wtih the invention.

Figure 5:
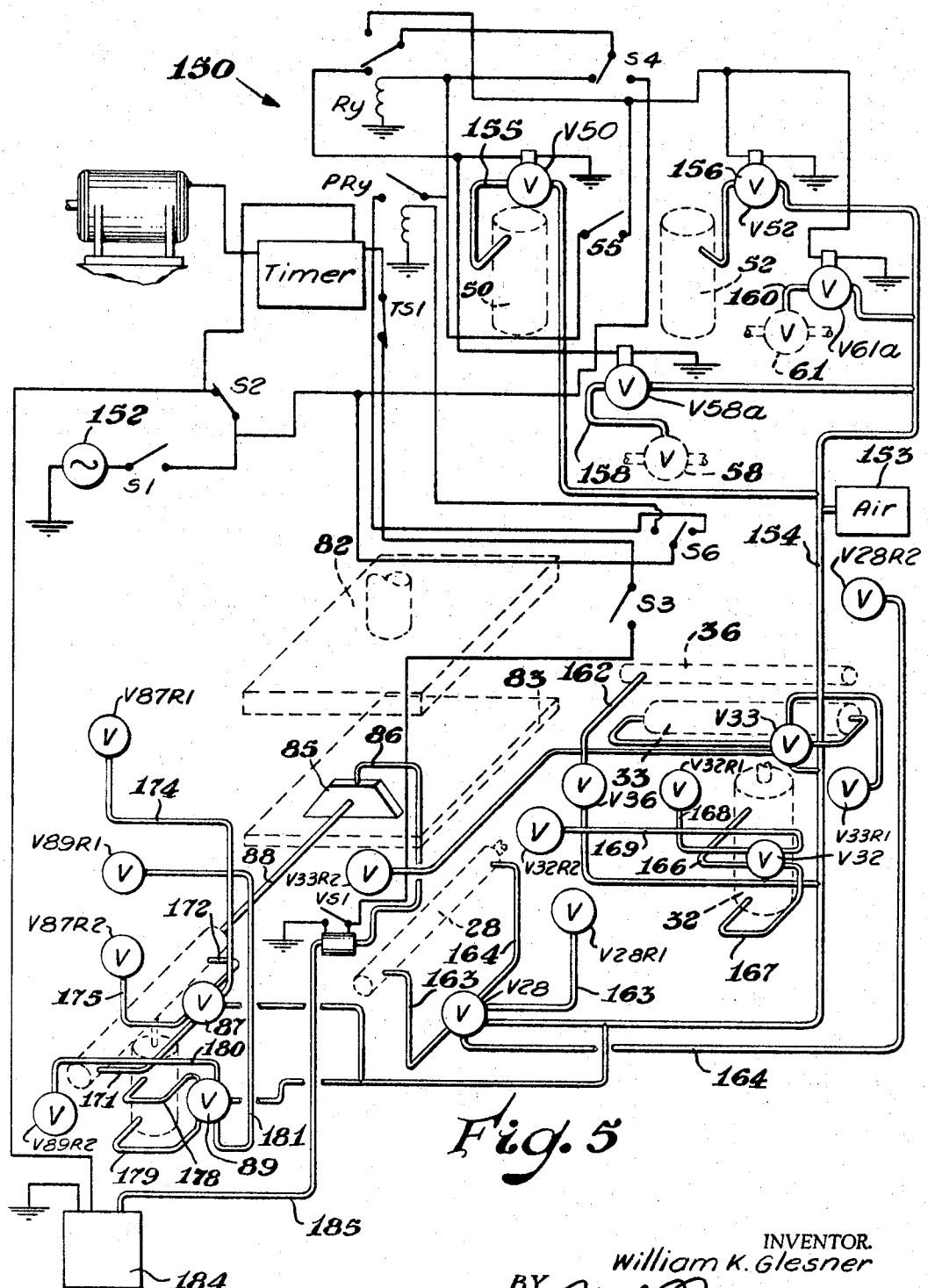
FIGURE 5 is a schematic illustration of one embodiment of controls for the apparatus 10 of FIGURE 1.

In FIGURE 5, there is illustrated a control arrangement eminently adapted to the apparatus 10 of FIGURE 1. The basic components of the positioning means and the resin supply and dispensing apparatus as well as the press are depicted in dotted lines beneath the control system designated generally by the reference numeral 150. The apparatus 150 comprises in cooperative combination a source 152 of electrical power and a source 153 of a pressurized fluid or compressed gas such as compressed air. The gas source is in operative communication with a branched supply header 154. The supply header is in operative communication with a plurality of double acting slide valves V28, V32, V33, V87 and V89, the numbers designating the actuating cylinders which the valves control. The header 154 is also in communication with solenoid valves V50, V52, V58a, V61a and the valve V36. The solenoid valve V50 is normally closed and is in communication with the cylinder 50 by means of the conduit 155. The valve V52 is normally closed and is in communication with the conduit 156 which supplies air to the cylinder 52. The valve V58a is a normally closed solenoid valve whose discharge actuates the normally closed valve V58 through the conduit 158. The valve V61a has its discharge side in operative communication with the valve 61 which is normally closed and is opened by the application of gas or fluid pressure from the discharge of V61a through a conduit 160. The valve V36 is a mechanically actuated valve which is normally closed having its discharge in operative communication with the single acting cylinder 36 by means of the conduit 162. The double acting fluid actuated slide valve V28 is operatively connected to the cylinder 28 by means of the conduits 163 and 164. A pair of pressure relief valves V28R1 and V28R2 are connected to V28 by the conduits 163 and 164, respectively. V32 is a fluid operated double acting slide valve operatively connected to the cylinder 32 by the conduits 166 and 167. A pair of pressure relief valves V32R1 and V32R2 are operatively connected to V32 by means of the conduits 168 and 169, respectively. The double acting slide valve V87 has its discharge connected to the cylinder 87 by means of the conduits 171 and 172. A pair of pressure relief valves V87R1 and V87R2 are operatively connected to V87 by means of the conduits 174 and 175, respectively. The double acting slide valve V89 has its discharges connected to the cylinder 89 by means of the conduits 178 and 179. A pair of pressure relief valves V89R1 and V89R2 are in operative connection with V89 by means of the conduits 180 and 181. The control apparatus 150 includes in operative association therewith an electrically operated vacuum source 184. The vacuum source 184 is in operative communication with a vacuum operated switch VS1 by means of a conduit 185. VS1 is so constructed and arranged so as to be normally open when atmospheric pressure is present within the conduit 180. The conduit 185 is also in operative communication with the vacuum line 86 to the shoe 85. The power source 152, for ease of illustration and description, is shown with one terminal grounded and a ground return is employed on devices such as the vacuum source 184 and other elements to be described. The ungrounded terminal of the power source 152 is connected to S1, a manually operated master switch. The terminal of S1 remote from the power source is in full electrical connection with S2, a switch which is normally open and is closed by pressure of the platen 82 when the press is fully open. The terminal of S2 remote from S1 is connected to a press motor controlling timer designated in the drawing as Timer and wtih the electrically operated vacuum source 184. The timer also activates the switch designated as TS1 which is connected to the terminal of S2 remote from S1. The terminal of S1 remote from the power source is connected to a single pole double throw switch S6. The switch S6 is maintained in the position illustrated in FIGURE 5 by the frame 39. When the cylinder 38 is in the fully retracted position, and when the cylinder 33 is in the fully retracted position, the closed terminal of S6 is connected to the contacts of a normally open pole of the time delay relay designated as PRy. The remaining pole of S6 is connected to the coil of the time delay relay PRy.

The ground return from the timer is through the switch TS1 controlled by the timer through S3 which is maintained in a closed position when the cylinder 33 is fully retracted through the contacts of VS1 to ground. The contact of PRy remote from S6 is connected to the coil relay of relay Ry and to one contact of a single pole double throw switch S4. The pole of S4 is connected to the pole of Ry which is of the single pole double throw variety. The remaining terminal of S4 is connected to the terminal of S1 remote from the power source. In the closed or energized position, Ry connects the center pole of S4 to the actuating solenoid of V50 and the actuating solenoid of V58. In the open or unenergized position, Ry connects the center pole of S4 to the operating solenoids of V52 and V61a.

In operation of the apparatus of FIGURE 1 employing the control arrangement 150 of FIGURE 5, operation is initially started by placing preforms, such as the preform 19, on the conveyor, in the press, and on the tines 44. Initially, S1 is open, the press is open, the cylinders 32, 52, 55 and 87 have their pistons at the uppermost position of travel. The cylinders 28, 33, 36, 70 and 89 have the shaft or platen retracted. The valves 58 and 61 are closed as are the solenoid valves. VS1 is open and the contacts of PRy are open. Switch 2 is closed by action of the press platen 82. Switch 3 is closed by the frame 39. Switch 4 is connected to the relay coil by virtue of the switch activator 54 on the shaft 53 of the piston 52. Switch 5 is a normally closed switch which is opened by contact with the activator 54 when the piston 52 is displaced downwardly to discharge resin therefrom and S6 is in the position illustrated in FIGURE 5 wherein the switch S1 is connected to one side of the pulse relay contacts.

Thus, on closing of S1 the timer is actuated and the press closes on the preform between the press platens 82 and 83. On completing its cycle the press opens and opens the valve X87R1 causing the cylinder 87 to project the shaft 88 and the shoe 85 into the press and simultaneously open the valve V89R1 to cause the cylinder 89 to raise the cylinder 87. The valve V89R2 between motion of the shaft 88 is opened causing the cylinder 89 to retract and then cause the shoe 85 to contact the preform. Closing of the master switch S1 also activates the vacuum source 184 which applies vacuum to the shoe 85 through the line 86. Presence of the preform on the shoe 85 causes a reduced pressure in the line 86 and closes the switch VS1. V89R2 is then opened causing the cylinder 89 to move upwardly which opens the valve. V87R2 causes the shoe 85 to be retracted from the press platen 83 and position the shoe over the conveyor 92 wherein the preform is mechanically dislodged from the shoe by means not shown. Retraction of the shoe 85 opens V33R2 causing a preform lying on the tines 40 to be positioned within the press and extending the stop 44 affixed to the shaft 42 of the cylinder 36. On reaching the extreme end of travel of the shaft 38, V32R1 is opened which causes the cylinder 32 to be retracted, opening V33R2, causing the shaft 38 to be retracted and the stop 44 remains extended causing the preform to drop into the press. On full retraction of the cylinder 33, V36 is opened applying air-pressure to retract the cylinder 36. This movement causes the opening of V28R1 causing the cylinder 28 to extend and position the preform on the tines 26 above the tines 40 when the positioner tines 26 are remotely positioned from the cylinder 38. V32R2 is opened by extension of cylinder 28 and the cylinders 33 and 36 are raised, raising the preform by the cylinder 32 to position the preform and tines 40 above the tines 26.

In the meanwhile, S6 has connected the powerline to the coil of the pulse relay PRy which is energized for a desired length of time and while S3 and VS1 are closed power is applied to the coil of the relay. With the piston of the cylinder 52 in the uppermost position V50 is opened applying air-pressure to the reservoir 50. Power is applied to the solenoid valve V58a which, in turn, opens the valve 58 assuring that the cylinder 52 is filled with the resin to be dispensed. At the end of a pre-determined time the pulse relay opens causing the relay to open which, in turn, opens the solenoid valves V52 applying pressure to the cylinder 52 to cause it to discharge. V61a is opened permitting the air-pressure to open V61 and cause the cylinder 52 to be in communication with the discharge lines 60a and 60b. Opening the valve 61 permits air to discharge the contents of the cylinder 52 through the lines 60a and 60b. As the cylinder 52 moves the cylinder of the piston 55 follows which, in turn, activates the cylinder 70 and moves the nozzles 63 and 64 along a pre-determined path. On completion of the stroke of the cylinder 52 and consequently the cylinder 70, the activator 54 closes S5 which closes the relay, opens V50, V58a and V58 while closing V52, V61a and V61, refilling the cylinder 52 with the material to be dispensed and causing the cylinder 70 to be retracted.

The foregoing steps occur during the time that the press is closed and the piece being molded is cured. At the end of the cure cycle, the press opens, opening V87R1 and the cycle wherein the mold part is removed from the press, an impregnated preform disposed in the press, a fresh preform transferred from the conveyor to a position below the nozzles and during the molding cycle is impregnated and a resinous supply is refilled employing an apparatus substantially as shown in FIGURE 1 and controlled in the manner of FIGURE 5.

Trays are prepared employing a glass fiber preform whose shape is maintained by a light coating of a urea formaldehyde resin. An impregnating resin was prepared by mixing 55 parts by weight of a commercially available alkyd resin sold under the designation of MFG–3482m, 36 parts by weight of ortho-chlorostyrene, 9 parts by weight styrene and 1 part by weight of mold release agent commercially available under the trade designation of Zelec mold release agent and 1 part by weight of benzoyl peroxide. Fifty-five parts by weight of the foregoing mixture were admixed with 45 parts by weight of clay as a filler. The resultant mixture was charged to the cylinder such as the cylinder 52 of FIGURE 1. The platens of the press were fitted with matched metal die molds and maintained at a temperature of about 120° centigrade. The press was closed with a pressure of 346 pounds per square inch. The molding cycle was 30 seconds and uniform trays were obtained which had excellent surface uniformity with no undesired flash and no undesired voids or part to part variations.

In a manner similar to the foregoing illustration, chairs, seats, table tops, flower pots and the like are readily fabricated in accordance with the method and apparatus of the present invention employing such resinous compositions as a mixture of 70 parts by weight of an isophthalic acid polyester, 30 parts by weight of styrene, 1 part by weight of benzoyl peroxide, 0.3 part by weight "Zelec" in admixture with 45 parts by weight of a finely ground calcium carbonate distributed on a glass fiber mat resulted in molded products contained about 35 weight percent of glass fiber. The cure time of this composition was about 2 minutes. Employing a formulation of 55 parts by weight isophthalic acid polyester resin, 45 parts by weight chlorostyrene, 1 part by weight benzoyl peroxide, ½ part by weight "Zelec" with 45 parts by weight calcium carbonate, molded articles are obtained by employing a cure cycle of about 15 seconds. In a manner similar to the foregoing illustrations other heat hardenable resinous compositions are quickly and efficiently molded to provide uniform products without significant part to part variations.

As is apparent from the foregoing specification, the apparatus of the present invention is susceptible of being embodied with various alternations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An apparatus for the impregnation and molding of hardenable resin impregnated porous preforms, the apparatus comprising in cooperative combination
 means to supply a porous preform, wherein the means to supply the preform is a conveyor belt,
 a transfer and positioning means adapted to receive a preform from the preform supply means and position the preform in a desired location, the transfer and positioning means comprising in cooperative combination a set of reciprocally mounted tine supports,
 a first set of reciprocally mounted tines,
 a second set of reciprocally mounted tines adapted to interdigitate with the first set of tines, the second set of tines being reciprocally positioned in a plane normal to the plane of the first set of tines, and to be positioned on either side of the plane containing the first set of tines,
 means to dispense a predetermined quantity of a hardenable substance in a pre-determined pattern on the preform,
 means to position the preform having a hardenable substance thereon in a molding means,
 means to remove a molded piece from the molding means,
 means to provide a sequential continuous operation of the apparatus.

2. The apparatus of claim 1 wherein the tines are positioned by means of pneumatic cylinders.

3. The apparatus of claim 1 wherein the means to dispense a pre-determined quantity of hardenable liquid comprises in cooperative combination
 a resin supply means,
 a positive displacement resin dispenser adapted to receive a resin from the resin supply,
 means to selectively connect and disconnect the resin supply from the resin dispensing means,
 means to discharge the resin from the supply means in a pre-determined pattern wherein the amount of resin discharged is proportional to the position of the resin discharge means relative to the transfer and positioning means.

4. The apparatus of claim 3 wherein the resin discharge means comprises at least one resin discharge nozzle,
 coupling means between the resin discharge means to position the nozzle at a location proportional to the volume of resin in the resin dispensing means.

5. The apparatus of claim 4 wherein the sequential operations are automatically controlled.

6. The apparatus of claim 5 wherein the resin dispensing means actuates a positive displacement piston in a hydraulic cylinder to displace a liquid,
 a double acting hydraulic cylinder operatively connected to the hydraulic cylinder, the double acting cylinder having
 an actuating means in operative engagement with resin dispensing objects which are moved in a pre-determined pattern, the movement being in proportion to the amount of resin discharged from the resin dispensing means.

7. The apparatus of claim 1 wherein the means to remove a molded piece from a molding means is a vacuum shoe.

8. The apparatus of claim 1 including means to prevent operation of the apparatus if a molded piece is not removed therefrom.

9. An apparatus for the impregnation and molding of hardenable resin impregnated porous preforms, the apparatus comprising in cooperative combination
 means to supply a porous preform,
 a transfer and positioning means adapted to receive a preform from the preform supply means and position the preform in a desired location,
 means to dispense a predetermined quantity of hardenable liquid, the dispensing means comprising in cooperative combination
 a resin supply means,
 a positive displacement resin dispenser adapted to receive a resin from the resin supply means,
 means to selectively connect and disconnect the resin supply from the resin dispensing means,
 means to discharge the resin from the supply means in a predetermined pattern wherein the amount of resin discharged is proportional to the position of the resin discharge means relative to the transfer and positioning means, and the resin being deposited in a pre-determined pattern on a selected portion of the preform,
 means to position the preform having a hardenable substance thereon in a molding means,
 means to remove a molded piece from the molding means, and
 means to provide sequential, continual, repetitive operation of the apparatus.

10. The apparatus of claim 9 wherein the resin discharge means comprises at least one resin discharge nozzle, coupling means between the resin discharge means to position the nozzle at a location proportional to the volume of resin in the resin dispensing means.

11. The apparatus of claim 10 wherein the sequential operations are automatically controlled.

12. The apparatus of claim 11 wherein the resin dispensing means actuates a positive displacement piston in a hydraulic cylinder to displace a liquid,
   a double acting hydraulic cylinder operatively connected to the hydraulic cylinder, the double acting cylinder having
   an actuating means in operative engagement with resin dispensing objects which are moved in a predetermined pattern, the movement being in proportion to the amount of resin discharged from the resin dispensing means.

13. The apparatus of claim 9 wherein the means to remove a molded piece from a molding means is a vacuum shoe.

14. The apparatus of claim 9 including means to prevent operation of the apparatus if a molded piece is not removed therefrom.

References Cited

UNITED STATES PATENTS

| | | | |
|---|---|---|---|
| 2,877,498 | 3/1959 | Schneider | 264—137 |
| 2,749,266 | 6/1956 | Eldred | 264—137 |
| 2,818,606 | 1/1958 | White | 264—137 |
| 2,963,744 | 12/1960 | Cooper | 264—137 |
| 2,140,614 | 12/1938 | Bancroft | 156—295 |
| 3,304,356 | 2/1967 | Palmai | 264—137 |

WILBUR L. McBAY, *Primary Examiner.*

ROBERT F. WHITE, *Examiner.*

R. B. MOFFITT, *Assistant Examiner.*